United States Patent [19]

Yagi et al.

[11] Patent Number: 5,076,765
[45] Date of Patent: Dec. 31, 1991

[54] SHAFT SEAL ARRANGEMENT OF TURBOCHARGER

[75] Inventors: Yoichi Yagi; Masahiro Aida, both of Yokohama, Japan

[73] Assignee: Nissan Motor Company, Altd., Japan

[21] Appl. No.: 388,045

[22] Filed: Aug. 1, 1989

[30] Foreign Application Priority Data

Aug. 3, 1988 [JP] Japan ............... 62-193880
Nov. 30, 1988 [JP] Japan ............ 63-156220[U]

[51] Int. Cl.⁵ .................. F02B 33/44; F04B 17/00
[52] U.S. Cl. ............................................ 417/407; 277/3
[58] Field of Search ............... 417/407, 408, 409; 277/135, 3; 60/611

[56] References Cited

U.S. PATENT DOCUMENTS

| 4,196,910 | 4/1980 | Aizu. | |
|---|---|---|---|
| 4,613,288 | 3/1986 | McInerney | 417/407 |
| 4,640,630 | 2/1987 | Yoshioka et al. | 417/407 |
| 4,781,553 | 11/1988 | Nomura et al. | 277/3 |

FOREIGN PATENT DOCUMENTS

| 322348 | 8/1930 | Fed. Rep. of Germany. |
| 60-116035 | 8/1985 | Japan. |
| 61-166134 | 10/1986 | Japan. |
| 266731 | 2/1950 | Switzerland. |
| 1045973 | 10/1966 | United Kingdom. |

OTHER PUBLICATIONS

D. G. Wilson: "Design of High Efficiency Turbomachinery and Gas Turbines", pp. 74-75, M.I.T. Press, Cambridge, U.S., 5/1990.

Primary Examiner—Richard A. Bertsch
Assistant Examiner—Laleh Jalali
Attorney, Agent, or Firm—Lowe, Price, LeBlanc & Becker

[57] ABSTRACT

A shaft seal arrangement of a turbocharger for an internal combustion engine having a throttle valve disposed upstream of a compressor of the turbocharger. The shaft seal arrangement is comprised of first and second seal rings fitted on a cylindrical thrust spacer mounted on a rotatable shaft on which turbine and compresser wheels are mounted. The first and second rings are located spaced from each other and positioned between the compressor and bearings for the rotatable shaft. An annular air chamber is formed between the first and second seal rings and supplied with atmospheric air through an air supply passage. The cross-sectional area of the air supply passage is set such that an increase in pressure difference between the air chamber and the side of the bearings over an experimental pressure difference value at which oil leakage from the bearing side to the compressor side begins is prevented, thereby effectively avoiding oil leakage even in an engine operating condition in which the throttle valve is fully closed.

5 Claims, 4 Drawing Sheets

SHAFT SEAL ARRANGEMENT OF TURBOCHARGER

BACKGROUND OF THE INVENTION

1. Field of the Invention

This invention relates to improvements in a shaft seal arrangement for a turbocharger, and more particularly to a shaft seal arrangement for preventing oil leak from a bearing side to a compressor side of the turbocharger.

2. Description of the Prior Art

A turbocharger installed in an internal combustion engine is usually provided with a shaft seal arrangement for preventing lubricating oil supplied to bearings from leaking out to the side of a compressor of the turbocharger. The bearings support a rotatable shaft on which a turbine and compressor wheels are fixedly mounted. Such a shaft seal arrangement is disclosed, for example, in Japanese Utility Model Provisional Publication Nos. 60-116035 and 61-166134, in which the rotatable shaft of the turbocharger is provided with two seal rings for preventing oil leakage. An air supply passage is formed to supply air into between the two seal rings. In this case, oil leakage from the bearings is suppressed by cancelling a pressure difference between the seal rings and the bearing housing.

However, when a throttle valve of an engine is disposed upstream of the turbocharger compressor, a greater vacuum is developed in the compressor in an engine operating condition in which the throttle valve is closed. As a result, the amount of air sucked out from between the seal rings to the side of the compressor wheel increases, so that air pressure between the seal rings lowers due to a pressure drop of air flowing through the air supply passage. This causes lubricating oil to leak from the bearing housing to the compressor wheel side of the turbocharger.

SUMMARY OF THE INVENTION

It is an object of the present invention to provide an improved shaft seal arrangement for a turbocharger, by which lubricating oil is prevented from leaking out from the side of a bearing for a rotatable shaft of the turbocharger to thereby reduce lubricating oil consumption.

A shaft seal arrangement of the present invention is for a turbocharger of an internal combustion engine having a throttle valve disposed upstream of a turbocharger compressor. First and second seal rings are disposed around and sealingly connected to a rotatable shaft of the compressor and located between the compressor and a bearing for the rotatable shaft. The first and second seal rings are located at the side of the bearing and the side of the compressor, respectively, to prevent oil leakage from the side of the bearing to the side of the compressor. An air supply passage is provided to supply atmospheric air between the first and second seal rings. The cross-sectional area A of the air supply passage is set to meet a relationship represented by the following equation under a condition of standard atmospheric pressure:

$$A \geqq S \times \sqrt{\frac{K \times \gamma \times R \times \left(\frac{2}{K+1}\right)^{(K+1)/(K-1)} \times T}{2 \times \Delta P_{min}}}$$

where $\Delta P_{min}$ is the minimum seal performance of the first seal ring; S is the maximum clearance of the seal ring; K is a ratio of specific heats; R is the gas constant of air; T is a temperature in the location between the first and second seal rings; and $\gamma$ is the specific gravity of air.

With the above arrangement, a sufficient amount of air can be supplied to the location between the first and second seal rings even under an operating condition in which air in the above-mentioned location is sucked out to the compressor side through the clearance of the seal ring. This prevents an increased in pressure difference between the above-mentioned location and the bearing side (at atmospheric pressure) over the minimum seal performance, i.e., $\Delta P_{min}$ (or an experimental pressure difference value at which oil leak from the bearing side to the compressor side begins), thereby preventing oil leakage from the bearing side to the compressor side. This largely suppresses oil consumption while preventing generation of white smoke in exhaust gas.

DESCRIPTION OF THE DRAWINGS

In the drawings, like reference numerals designate corresponding elements and parts throughout all figures, in which.

DETAILED DESCRIPTION OF THE INVENTION

Figure 1:
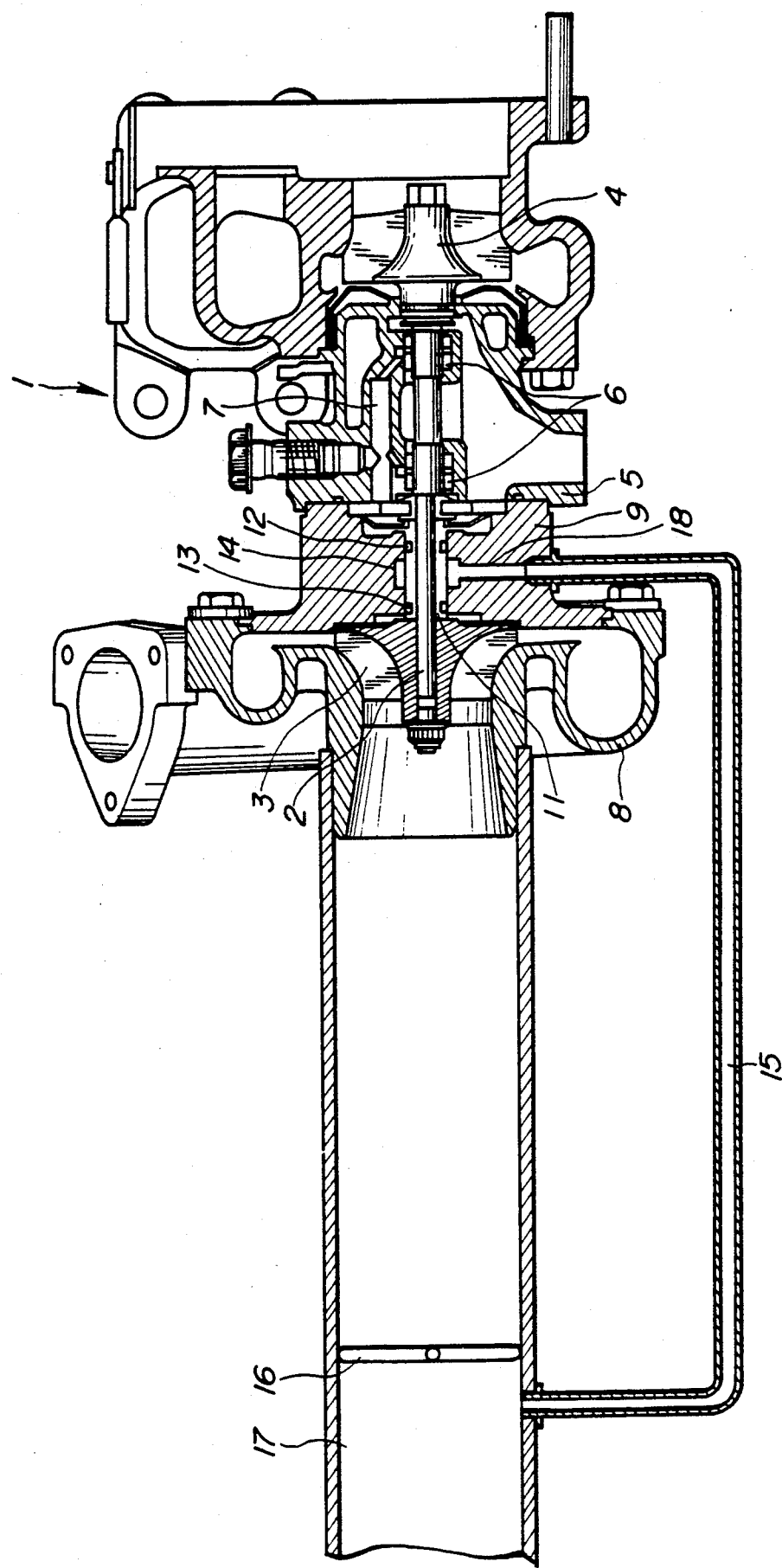
FIG. 1 is a longitudinal sectional view of a turbocharger including a first embodiment of a shaft seal arrangement according to the present invention.
Figure 2:
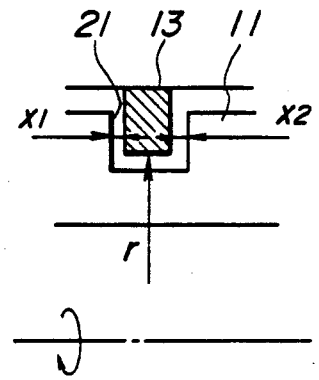
FIG. 2 is an enlarged fragmentary sectional view of an essential part of the shaft seal arrangement of FIG. 1.

Referring now to FIGS. 1 and 2, there is shown a first embodiment of a shaft seal arrangement of a turbocharger 1 in accordance with the present invention. The turbocharger 1 of this instance is in an automotive vehicle and includes a rotatable shaft 2 on which a compressor wheel 3 and a turbine wheel 4 are coaxially fixedly mounted spaced from each other. The compressor wheel 3 forms part of a compressor (no numeral) for intake air. The turbine wheel 4 forms part of a turbine and is rotated by exhaust gas. The rotatable shaft 2 is journalled through a floating metal 6 on a bearing housing 5. The floating metal 6 is maintained in a floating state relative to the inner supporting surface of the bearing housing 5 under the influence of engine lubricating oil supplied through an oil passage 7 leading from an engine oil lubricating system (not shown). A compressor housing 8 surrounding the compressor wheel 3 is connected through a back plate 9 (fixed support member) to the bearing housing 5. A cylindrical thrust spacer 11 is mounted or fitted on the rotatable shaft 2 and rotatably fitted in a bore (no numeral) of the back plate 9. Two seal rings 12, 13 are generally coaxially interposed between the thrust spacer 11 and the back plate 9 to thereby accomplish a fluid-tight seal between the bearing housing 5 and the compressor housing 8. More specifically, each seal ring 12, 13 is disposed in an annular groove (21 in FIG. 2) formed coaxially on the peripheral surface of the thrust spacer 11 as shown in FIG. 2, in which the outer periphery of each seal ring 12, 13 is contactable with the inner peripheral surface (defining the bore) of the back plate 9.

An annular air chamber 14 surrounds the peripheral surface of a longitudinally intermediate part of the thrust spacer 11. The air chamber 14 communicates through an air supply passage 15 with an air intake passageway 17 upstream of a throttle valve 16. The air intake passageway 17 is fluidly connected through the compressor wheel 3 to engine cylinders (not shown) of the engine. The throttle valve 16 is rotatably disposed in the intake air passageway 17 upstream, of the compressor wheel 3 to control the amount of air to be supplied to the engine cylinders.

In the above arrangement, the volume flow rate Q of air sucked from the air chamber 14 to the side of the compressor wheel 3 is smaller than a so-called choke flow rate or a flow rate of air flowing when the throttle valve 16 is fully closed. Therefore, the volume flow rate Q for a maximum clearance area S for the seal ring 13 under a standard condition of atmospheric pressure ($P_0$) is given by the following equation:

$$Q = S \times \sqrt{K \times g \times R \times \left(\frac{2}{K+1}\right)^{(K+1)/(K-1)}} \times \sqrt{T} \quad (1)$$

where K is ratio of specific heats; g is gravitational acceleration; T is a temperature in the air chamber 14; and R is the gas constant of air. The maximum clearance area S is determined by an equation of $S = \min(x_1, x_2) \times 2\pi r$ where $x_1$ and $x_2$ are respectively the opposite side clearances of the seal ring 13 relative to the wall surfaces of the groove 21; and r is the inner diameter of the seal ring 13 as shown in FIG. 2.

A pressure difference $\Delta P$ between the bearing housing 5 and the air chamber 14 must be smaller than a minimum seal performance $\Delta Pmin$. Here, the flow velocity v of air flowing through the air supply passage 15 in the standard condition is given by the following equation:

$$v = \sqrt{\frac{2g \times \Delta P}{\gamma}} \leq \sqrt{\frac{2g \times \Delta Pmin}{\gamma}} \quad (2)$$

where $\gamma$ is the specific gravity of air.

In the air supply passage 15, air must flow at this flow velocity and in the above-mentioned flow rate Q, and therefore the cross-sectional area A of a through-hole 18 forming part of the air flow passage 15 should be in a relationship as represented by the following equation derived from the above-equations (1) and (2):

$$A = \frac{Q}{v} \geq \frac{Q}{\sqrt{\frac{2g \times \Delta Pmin}{\gamma}}} \quad (3)$$

$$= S \times \sqrt{\frac{K \times \gamma \times R \times \left(\frac{2}{K+1}\right)^{(K+1)/(K-1)} \times T}{2 \times \Delta Pmin}}$$

where K is ratio of specific heats; R is the gas constant of air; T is a temperature in the air chamber; and $\gamma$ is the specific gravity of air. The minimum seal performance is determined by the following experiment: An experimental device is arranged in the same condition as in the turbocharger 1 shown in FIG. 1. The rotatable shaft (2) of the experimental device is rotated under a condition in which oil mist is filled on the side of the bearing housing (5), during which the pressure difference between the opposite positions of the ring seals is altered. A pressure value of the pressure difference at which oil mist begins to leak through the seal rings is determined as the minimum seal performance $\Delta min$.

The operation of the thus arranged intake system will be discussed hereinafter.

The inside of the bearing housing 5 is maintained at about atmospheric pressure although there is a slight leak of exhaust gas from the side of the turbine wheel 4 into the bearing housing 5. The air chamber 14 is also maintained at about atmospheric pressure because of being supplied with atmospheric pressure prevailing in the air intake passageway 17 upstream of the throttle valve 16. In an engine operating condition in which the throttle valve 16 is closed, the back side of the compressor wheel 3 is under vacuum and therefore air is sucked out from the air chamber 14 to the side of the compressor wheel 3. The amount of the sucked out air is considerably small and therefore negligible. At this time, if the amount of air flowing through the air supply passage 15 becomes larger over a predetermined level, the air chamber 14 becomes under vacuum owing to a pressure drop in the air supply passage 15. This seems to cause oil leak through the seal ring 12 from the bearing housing 5.

However, according to this embodiment, the cross-sectional area of the air supply passage 15 is determined so that the pressure difference between the air chamber 14 and the bearing housing 5 does not increase above below the minimum seal performance $\Delta Pmin$. Accordingly, the air chamber 14 is prevented from becoming vacuumized, thereby securely avoiding oil leakage from the bearing housing 5.

Figure 3:
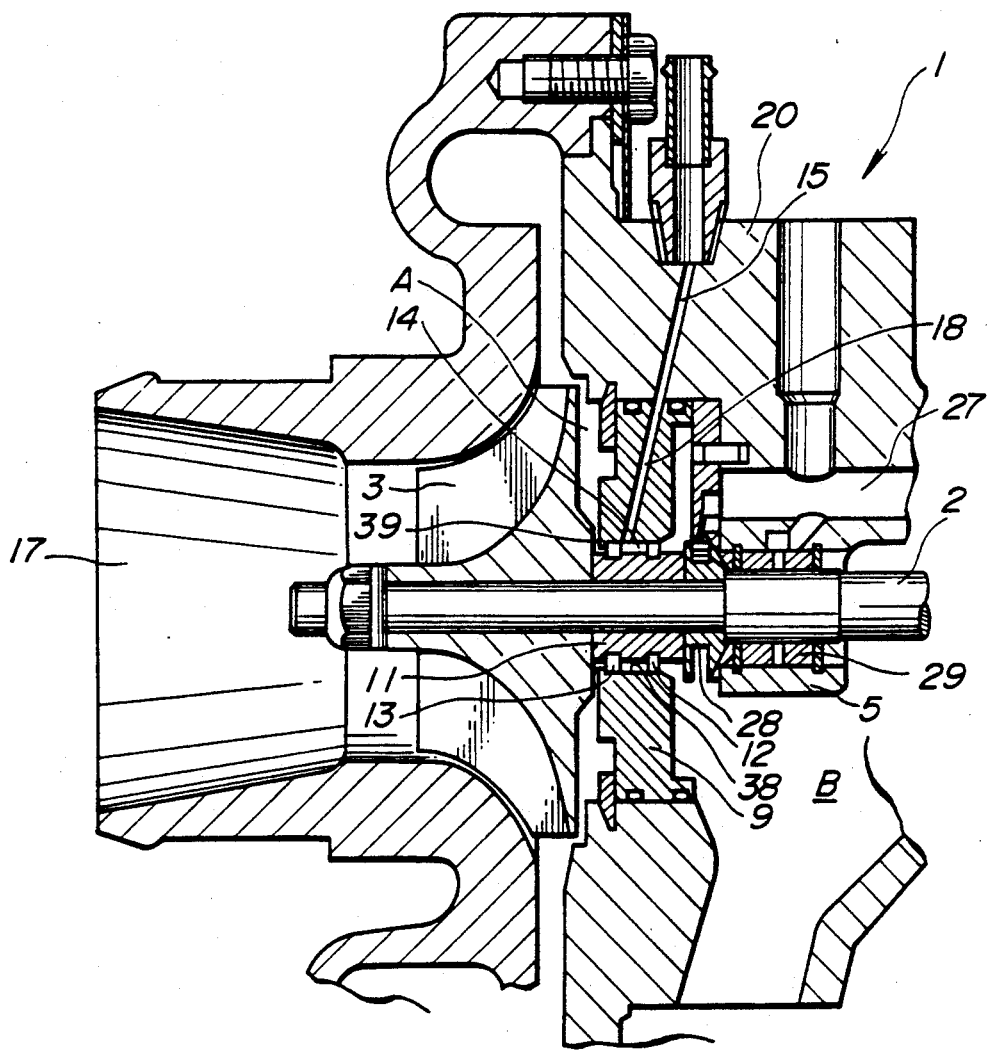
FIG. 3 is a fragmentary sectional view of a turbocharger including a second embodiment of the shaft seal arrangement according to the present invention.
Figure 4:
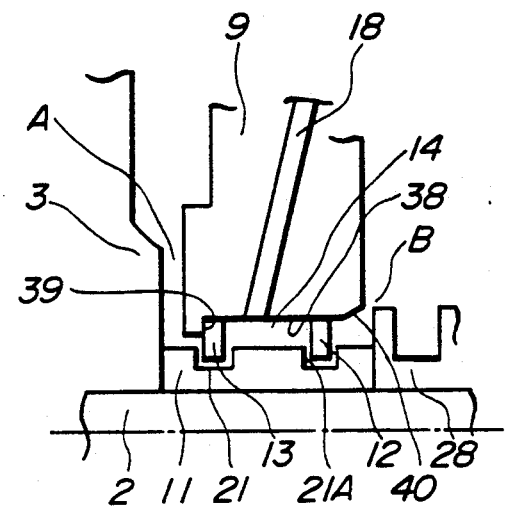
FIG. 4 is an enlarged sectional view of the shaft seal arrangement of FIG. 3.

FIGS. 3 and 4 illustrate a second embodiment of the shaft seal arrangement in accordance with the present invention, which is similar to the first embodiment shaft seal arrangement. In this embodiment, the two seal rings 12, 13 are disposed between the cylindrical thrust spacer 11 and the back plate 9. More specifically, the seal rings 12, 13 are respectively fitted in the two annular grooves 21A, 21 formed coaxially on the outer peripheral surface of the thrust spacer 11, and contactable at its outer peripheral surface with the surface 38 of the bore of the back plate 9. The annular air chamber 14 is defined between the seal rings 12, 13 and between the thrust spacer 11 and the back plate 9. The air chamber 14 is open to atmospheric air through the through-hole 18 and the air supply passage 15.

The rotatable shaft 2 is journalled in the bearing housing 5 through a bearing metal 29 which is supplied with lubricating oil through a lubricating oil passage 27. The lubricating oil circulates through a bearing chamber B. A thrust collar 28 is disposed between the bearing metal 29 and the thrust spacer 11.

In this embodiment, the surface 38 of the bore of the back plate 9 is formed right cylindrical so that the seal rings 12, 13 are axially slidably supported by the bore surface 38. The back plate 9 is integrally formed with an annular stop section 39 which extends radially inwardly from the bore surface 38. The annular stop section 39 is formed on the side of the compressor wheel 3. The seal ring 13 at the compressor wheel side is contactable at its side surface with the annular stop section 39, thereby restricting movement of the seal ring 13 toward the compressor wheel 3.

Each seal ring 12, 13 is fitted in the annular groove 21A, 21 with a predetermined side clearance (a total clearance between the side surface of the seal ring and the side surface of the annular groove). The side clearance for the annular groove 21A and seal ring 12 at the bearing metal side is set at about 50 μm taking only machining error into consideration. The side clearance for the annular groove 21 and for the seal ring 13 on the compressor wheel side is set at a range of from 90 to 150 μm which is not less than 1.8 times of the above side clearance of about 50 μm, taking into account machining error and the axial displacement of the rotatable shaft 2.

In operation, the seal ring 12 seems to displace toward the side of the compressor wheel 3 under the action of a pressure difference (about 600 mmHg in maximum) between the back side A of the compressor wheel 3 and the bearing chamber B. However, the seal ring 13 is brought into contact with the annular stop 39 and therefore is prevented from displacement toward the compressor wheel 3. As a result, the seal ring 13 can be prevented from being pressed against the side surface of the groove 21. This prevents wear of seal ring 13 while suppressing the friction loss of the rotatable shaft 2 to a lower level, thus maintaining a high acceleration response of the turbocharger.

The annular air chamber 14 is supplied with atmospheric air and therefore always maintained at about atmospheric pressure regardless of engine operating conditions. Consequently, a pressure difference is hardly developed between the annular chamber 14 and the bearing chamber B so that no pressure difference is applied to the seal ring 12 on the bearing metal side. As a result, a force for pressing the seal ring 12 against the side wall of the groove 21A is very small, and accordingly wear of the seal ring 12 can be prevented though there is no annular stop section for the seal ring 12. This suppresses the friction loss of the rotatable shaft 2 at a lower value, thereby maintaining a high acceleration response of the turbocharger.

Since no step section is formed at the bore surface 38 of the back plate 9, the seal ring 12 is axially slidably supported and therefore the side clearance for the seal ring 12 and the annular groove 21A is not required to be set larger taking account of the axial displacement amount (about 40 to 100 μm) of the rotatable shaft 2. Consequently, the side clearance for the seal ring 12 is set, for example, at 50 μm taking account of only machining accuracy of annular groove 21A. As a result, the amount of lubricating oil leaking through the clearance between the seal ring 12 and the side surfaces of the annular groove 21A is minimized thereby providing a sufficient sealing ability.

The back plate 9 is formed with only one annular stop section (a step section) which requires a relatively high machining accuracy, thereby lowering production cost of the turbocharger. Besides, since only an annular tapered section 40 at an end section of the back plate bore surface 38 is required, the axial length of the rotatable shaft required for shaft seal is shortened and therefore the flexural rigidity of the rotatable shaft 2 is increased, thereby improving the vibrational characteristics and durability of the rotatable shaft 2.

Figure 5:
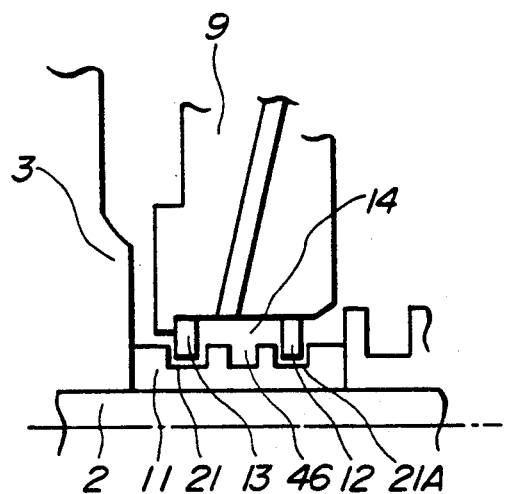
FIG. 5 is an enlarged sectional view similar to FIG. 4 but showing a modified example of the shaft seal arrangement of FIGS. 3 and 4.

FIG. 5 shows a modified example of the second example shaft seal arrangement. In this example, a further annular groove 46 is formed at the outer peripheral surface of the thrust spacer 11 and located between the annular grooves 21A, 21. The annular groove 46 forms part of the annular air chamber 14, thereby increasing the volume of the air chamber 14 formed between the thrust spacer 11 and the back plate 9. By virtue of this air chamber 14 having an increased volume, a pressure variation within the annular air chamber 14 is suppressed thereby providing a stable sealing ability Besides, the annular groove 46 decreases the rotating mass of the turbocharger and does not obstruct the installation operation of the seal ring 12 as compared with a case in which the corresponding annular groove (46) is formed in the back plate 9.

Figure 6:
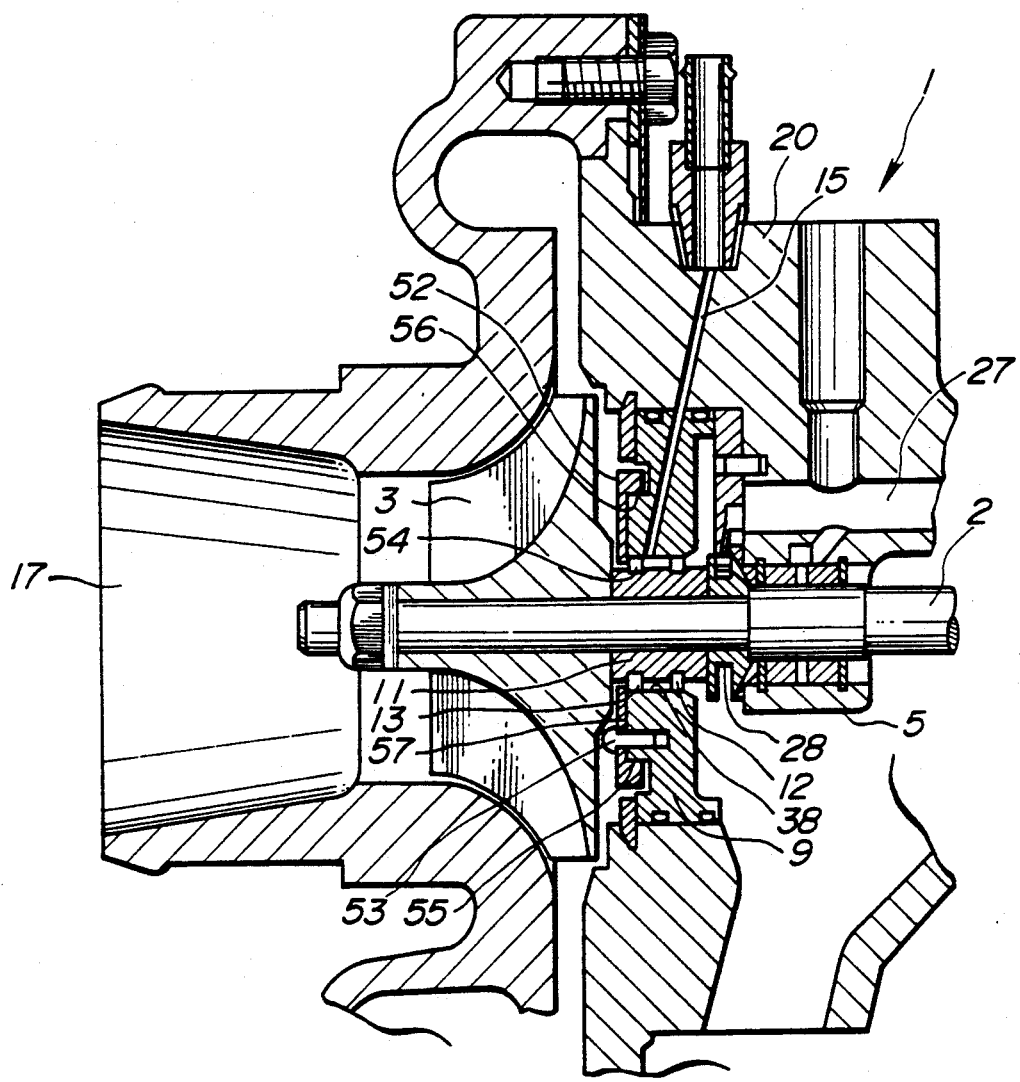
FIG. 6 is a fragmentary sectional view similar to FIG. 3 but showing another modified example of the shaft seal arrangement of FIGS. 3 and 4.

FIG. 6 shows another example of the second embodiment shaft seal arrangement in accordance with the present invention. In this example, an annular stopper plate 52 is installed to the back plate 9 at the end face 57 opposite to the compressor wheel 3 by means of small screws 53. The outer peripheral section of the annular stopper plate 52 extends radially inwardly from the bore surface 38 of the back plate 9 and therefore serves as the annular stop section (39) for restricting the movement of the seal ring 13. In this example, the back plate 9 is formed at its end surface opposite to the compressor wheel 3 with an annular groove 55 in which an annular projection 56 of the stopper plate 52 is fitted, so that an installation accuracy of the stopper plate 52 is improved. It will be understood that installation of the annular projection 56 of the stopper plate 52 may be made by means of either one of press-fitting or with small screws 53. With this arrangement, precise locating of the ring seal 13 is controlled by the side end face 57 of the back plate 9 thereby to lower a production cost of the turbocharger.

What is claimed is:

1. A shaft seal arrangement in a turbocharger for an internal combustion engine having a throttle valve disposed upstream of a compressor of the turbocharger, said shaft seal arrangement comprising:

first and second seal rings disposed around and sealingly contacting a rotatable shaft of the compressor and located between the compressor and a bearing for the rotatable shaft, said first and second seal rings being respectively located at a side of the bearing and a side of the compressor to prevent oil leakage from the side of the bearing to the side of the compressor;

means between the compressor and bearing for defining an air supply passage through which a location between said first and second seal rings is supplied with atmospheric pressure;

wherein a cross-sectional area A of said air supply passage is set to meet a relationship represented by the following equation under a condition of standard atmospheric pressure:

$$A \geqq S \times \sqrt{\frac{K \times \gamma \times R \times \left(\frac{2}{K+1}\right)^{(K+1)/(K-1)} \times T}{2 \times \Delta P_{min}}}$$

where ΔPmin is the minimum seal performance of said first seal ring; S is the maximum clearance of said second seal ring; K is a ratio of specific heats; R is the gas constant of air; T is a temperature in the location between said first and second seal rings; and τ is the specific gravity of air.

2. A shaft seal arrangement as claimed in claim 1, further comprising a cylindrical thrust spacer fitted on the turbocharger rotatable shaft and rotatably supported by a fixed support member, said cylindrical thrust spacer being formed with first and second coaxial annular grooves, said first and second seal rings being disposed respectively in said first and second annular grooves, said maximum clearance being defined between said second seal ring and wall surface of said thrust spacer defining said first annular groove, said first and second seal rings being slidingly contactable with the fixed support member.

3. A shaft seal arrangement as claimed in claim 1, further comprising means for maintaining the bearing in a floating state under the influence of oil, and means for supplying said oil around the bearing.

4. A shaft seal arrangement as claimed in claim 1, further comprising means defining a generally right cylindrical supporting surface on which said first and second seal rings are slidably supporting at their outer periphery, said cylindrical supporting surface being formed around said rotatable shaft, and a stop section in fixed relation to said cylindrical supporting surface defining means and located at the compressor side relative to said second seal ring, said stop section extending radially inwardly relative to said cylindrical supporting surface, said second seal ring being contactable with said stop section, and means defining first and second annular grooves formed on the side of said rotatable shaft, said first and second seal rings being fitted in said first and second annular grooves with predetermined side clearances, respectively.

5. A shaft seal arrangement of a turbocharger for an internal combustion engine having a throttle valve disposed upstream, of a compressor of the turbocharger, said shaft seal arrangement comprising:

first and second seal rings disposed around and sealingly contacting to a rotatable shaft of the compressor and located between the compressor and a bearing for the rotatable shaft, said first and second seal rings being located at a side of the bearing and a side of the compressor to prevent oil leakage from the bearing side to the compressor side;

means defining an air supply passage through which a location between said first and second seal rings is supplied with atmospheric pressure;

means defining a generally cylindrical supporting surface on which said first and second seal rings are slidably supported at their outer periphery, said cylindrical supporting surface being formed around said rotatable shaft;

a stop section in fixed relation to said cylindrical supporting surface defining means and located at the compressor side relative to said second seal ring, said stop section extending radially inwardly relative to said cylindrical supporting surface, said second seal ring being contactable with said stop section; and means defining first and second annular grooves formed at the side of said rotatable shaft, said first and second seal rings being fitted in said first and second annular grooves with predetermined side clearances, respectively.

* * * * *

UNITED STATES PATENT AND TRADEMARK OFFICE
CERTIFICATE OF CORRECTION

PATENT NO. : 5,076,765

DATED : December 31, 1991

INVENTOR(S) : Yagi et al

It is certified that error appears in the above-identified patent and that said Letters Patent is hereby corrected as shown below:

IN THE TITLE PAGE:

[73] Should read as follows:
    Assignee: NISSAN MOTOR COMPANY, LTD.
              Yokohama, Japan Signed and Sealed this Twenty-second Day of August, 1995

Attest:

BRUCE LEHMAN

Attesting Officer

Commissioner of Patents and Trademarks